No. 882,091. PATENTED MAR. 17, 1908.
A. BALLOCO.
SPEED CHANGE MECHANISM.
APPLICATION FILED DEC. 4, 1906.

Witnesses.
Jesse N. Lutton.
B. V. Dommers.

Inventor
Alberto Balloco
by Henry Orth Jr.
Atty.

United States Patent Office.

ALBERTO BALLOCO, OF TURIN, ITALY, ASSIGNOR TO ITALA FABBRICA DI AUTOMOBILI, OF TURIN, ITALY, A COMPANY.

SPEED-CHANGE MECHANISM.

No. 882,091.　　　　Specification of Letters Patent.　　Patented March 17, 1908.

Application filed December 4, 1906. Serial No. 346,294.

*To all whom it may concern:*

Be it known that I, ALBERTO BALLOCO, a subject of the King of Italy, residing at Turin, in the Kingdom of Italy, (whose post-office address is 31 via Petrarca,) mechanical engineer, have invented certain new and useful Improvements in Speed-Change Mechanisms for Automobiles and the Like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention has for its object to provide in a speed change mechanism comprising several trains of sliding or movable gears, an improved locking mechanism for automatically preventing the displacement of the gears while out of mesh.

Figure 1:
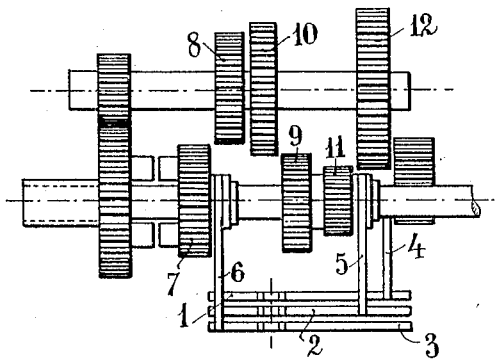
Figure 2:
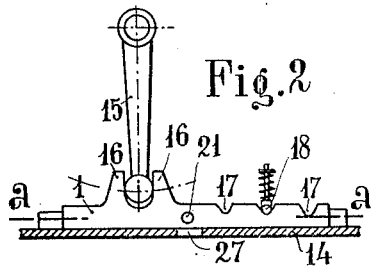
Figure 3:
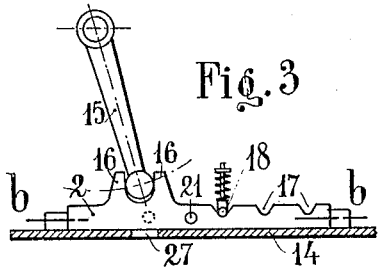
Figure 5:
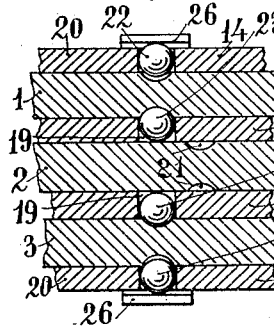
Figure 4:
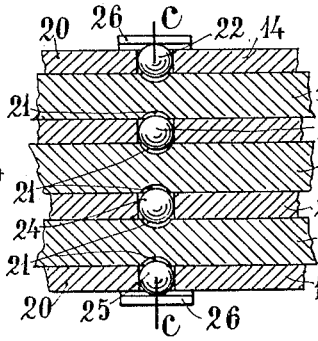
Figure 6:
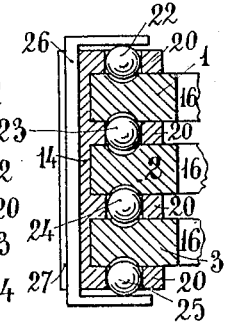

In the annexed drawings: Figure 1 is a plan view of the trains of gearing of a speed change mechanism. Fig. 2 is a front view partly in section of my improved safety mechanism in its resting position. Fig. 3 is a like view showing the mechanism in its operative position. Fig. 4 is an horizontal sectional view on line $a—a$ of Fig. 2. Fig. 5 is an horizontal sectional view on line $b—b$ of Fig. 3. Fig. 6 is a vertical sectional view on line $c—c$ of Fig. 4.

1, 2, 3 designate sliding bolts or lock bars supporting respectively forks 4, 5 and 6 which control the sliding train of gearings 7, 8; 9, 10; and 11, 12 respectively. These bolts or lock bars slide in grooves formed by ribs 20 on a fixed piece 14. The gears operated by the bolts engage the corresponding gears as in like arrangements, and the bolts may be moved one at a time forward or backward from their resting position by a lever 15. This latter may be moved axially, and brought into engagement with shoulders or projections 16 of either of said bolts or bars 1, 2, 3 when these latter are in their resting position.

The bolts or bars are provided with angular or side beveled notches 17 corresponding to the different positions each bar may be caused to assume. Said notches will be engaged by a spring pawl 18 (one for each bar) holding the bar in each of the different positions in which it has been brought by the rotation of the controlling lever 15.

While the lever 15 is in engagement with one of the bars and has brought into mesh a couple of gears, the other bars are, in the known constructions, secured in their resting position only by a pawl corresponding with pawl 18. It frequently happens that owing to the continuous vibrations or to a shock, one of the resting bars overcomes the action of its spring pawl and by its displacement causes another pair of gears to engage. Such an engagement would of course produce great damage and to prevent this I provide additional locking means. Each rib 20 throughout the fixed piece 14 has a co-axial recess 19 formed at about half the height of the rib the diameter of said recess being somewhat greater than the thickness of the rib. Each bar has a recess 21 formed in both faces which will register with the recesses 19 when the bar is in its resting position.

In the recesses 19 are placed balls 22, 23, 24, 25, of a diameter somewhat smaller than said recesses 19. The recesses 21 have a depth equal to the difference between the diameter of the recess 19 and the thickness of the ribs so that when a ball fully enters a recess 21 as shown in Fig. 5, it will not project into the adjoining groove, but will allow the bar therein to be slid.

A retaining member consisting of an U-shaped piece 26 is slidably mounted in a groove 27 formed transversely to the grooves in the piece 14 beneath the recesses 19; the distance between the two branches of the U-shaped piece 26 being equal to the width of the piece 14 plus the above said difference between the diameter of the balls and the thickness of the ribs 20.

The several bars being in the position shown in Figs. 4, 6, it will be seen by referring to Fig. 5 that, by moving one of the bars, *i. e.* bar 2, the two balls situated at its sides will be moved out of their recesses 21 and will therefore automatically lock the other two bars, either directly as in the case when moving the center bar 2 or through the U-shaped piece 26 controlling the position of the two outer balls when the moved bar is a lateral one.

If there are only two bars, it is obvious that a single ball placed in the wall or partition between the two recesses 21 will be sufficient for the purpose.

Claims.

1. In an interlocking mechanism, the combination of a stationary member having ribs forming parallel channels between them, said ribs having co-axial recesses therein, balls loose in said recesses, a transversely slidable member engaging the balls in the outer ribs, and sliding members in said channels having recesses on opposite sides to receive the balls in the ribs, whereby each sliding member is capable of being locked on both sides.

2. In an interlocking mechanism, the combination of a stationary member having ribs forming three or more parallel channels, said ribs having co-axial recesses, a sliding member mounted in each channel having entering recesses on both faces, a ball mounted in the rib recesses adapted to interlock the slides and a retaining member slidably mounted in the stationary members having arms in contact with the balls in the outer ribs.

In testimony that I claim the foregoing as my invention, I have signed my name in presence of two subscribing witnesses.

ALBERTO BALLOCO.

Witnesses:
FRAMENO TIMONUM,
LOUIS ALLAN.